(12) United States Patent
Resnick (10) Patent No.: US 8,707,092 B2
(45) Date of Patent: *Apr. 22, 2014

(54) FAILURE RECOVERY MEMORY DEVICES AND METHODS

(75) Inventor: David R. Resnick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/279,926

(22) Filed: Oct. 24, 2011

(65) Prior Publication Data

US 2012/0042201 A1 Feb. 16, 2012

Related U.S. Application Data

(63) Continuation of application No. 12/479,530, filed on Jun. 5, 2009, now Pat. No. 8,046,628.

(51) Int. Cl.
*G06F 11/00* (2006.01)

(52) U.S. Cl.
USPC ......... 714/6.24; 714/6.1; 714/6.11; 714/6.12; 714/6.2; 714/767

(58) Field of Classification Search
USPC .......... 714/5, 6, 52, 6.1, 6.11, 6.12, 6.2, 6.24, 714/767
See application file for complete search history.

(56) References Cited

U.S. PATENT DOCUMENTS

| 5,928,343 | A * | 7/1999 | Farmwald et al. | 710/104 |
|---|---|---|---|---|
| 6,683,372 | B1 * | 1/2004 | Wong et al. | 257/686 |
| 7,000,062 | B2 * | 2/2006 | Perego et al. | 711/5 |
| 7,206,962 | B2 * | 4/2007 | Deegan et al. | 714/6.2 |
| 7,363,533 | B2 * | 4/2008 | Gower et al. | 714/6.24 |
| 7,484,161 | B2 * | 1/2009 | Dell et al. | 714/758 |
| 7,676,729 | B2 * | 3/2010 | Cheng et al. | 714/767 |
| 7,701,251 | B1 * | 4/2010 | Rahman et al. | 326/41 |
| 7,746,095 | B2 * | 6/2010 | Pax et al. | 326/21 |
| 7,779,292 | B2 * | 8/2010 | Fields et al. | 714/5.11 |
| 7,840,860 | B2 * | 11/2010 | Alves et al. | 714/710 |
| 8,046,628 | B2 | 10/2011 | Resnick | |
| 2005/0105350 | A1 * | 5/2005 | Zimmerman | 365/201 |
| 2005/0162882 | A1 * | 7/2005 | Reeves et al. | 365/63 |
| 2006/0146637 | A1 * | 7/2006 | Vogt | 365/230.03 |
| 2006/0179362 | A1 * | 8/2006 | Alves et al. | 714/52 |
| 2006/0271720 | A1 * | 11/2006 | James et al. | 710/306 |
| 2007/0136537 | A1 * | 6/2007 | Doblar et al. | 711/154 |
| 2008/0101104 | A1 * | 5/2008 | Ikeda | 365/51 |
| 2008/0307252 | A1 * | 12/2008 | Bartley et al. | 714/6 |
| 2008/0307253 | A1 * | 12/2008 | Bartley et al. | 714/6 |
| 2009/0006886 | A1 * | 1/2009 | O'Connor et al. | 714/5 |
| 2009/0049365 | A1 * | 2/2009 | Kim et al. | 714/767 |
| 2009/0237971 | A1 * | 9/2009 | Chung et al. | 365/51 |
| 2010/0042889 | A1 * | 2/2010 | Hargan | 714/752 |
| 2010/0217915 | A1 * | 8/2010 | O'Connor et al. | 711/5 |
| 2010/0240205 | A1 * | 9/2010 | Son et al. | 438/588 |

(Continued)

*Primary Examiner* — Joshua P Lottich
(74) *Attorney, Agent, or Firm* — Schwegman, Lundberg & Woessner, P.A.

(57) ABSTRACT

Memory devices and methods are described that include serially chained memory devices. In one or more of the configurations shown, a serial chain of memory devices includes a number of memory devices, and an error recovery device at an end of the chain. In one configuration shown, the serial chain of memory devices includes a chain of devices where each device is a stacked die memory device. Methods are described that show using the error recovery device in write operations and data recovery operations.

20 Claims, 5 Drawing Sheets

(56) References Cited

U.S. PATENT DOCUMENTS

2010/0299576 A1* 11/2010 Baysah et al. ............... 714/763
2010/0313067 A1   12/2010 Resnick
2011/0231735 A1*  9/2011 Park et al. .................... 714/767

* cited by examiner

FAILURE RECOVERY MEMORY DEVICES AND METHODS

PRIORITY APPLICATION

This application is a continuation of U.S. application Ser. No. 12/479,530, filed Jun. 5, 2009 now U.S. Pat. No. 8,046,628, which is incorporated herein by reference in its entirety.

TECHNICAL FIELD

Various embodiments described herein relate to apparatus, systems, and methods associated with semiconductor memories.

BACKGROUND

A number of configurations in computer memory exist to protect data against errors or failure of memory devices. Error Check and Correcting (ECC) configurations such as Chipkill™ exist that protect computer memory systems from any single memory chip failure as well as multi-bit errors from any portion of a single memory chip. In Chipkill™, bits of multiple ECC words are scattered across multiple memory chips, such that the failure of any one memory chip will affect each ECC value looking like multiple correctable errors. This allows memory contents to be reconstructed despite the complete failure of one chip. ECC implementations more complex than Chipkill™ are seldom done with most current high density memory integrated circuits because of the additional memory and chip area required. Simpler detection/correction schemes such as parity check or single bit correction are often implemented.

In computer hard drive memory, Redundant Arrays of Inexpensive Disks (RAID) configurations allow backup of data when multiple drives are arranged in parallel, where n+1 drives are used to store data. The extra memory of the "1" drive of n+1 in a RAID 4 or RAID 5 configuration is used to store the ECC data. However, RAID configurations are often relatively slow during write operations because each write requires updating of the ECC data, such that two writes are required for every operation (one for the data being written, and another for the updated ECC being written). Performance of a RAID 5 configuration when writing is approximately one half the performance of reading. Other operations of a parallel RAID configuration, such as data recovery, can be much slower than half the speed of a read operation.

The inventor has realized that improved memory configurations with error recovery are desired that reduce the amount of memory needed to store error recover data (e.g., ECC data) for cases where recovery from failures of memory components is required. The inventor has further realized that improved memory configurations with error recovery are desired that reduce any impact to operating speed during error recovery, data write operations, etc. The inventor has further realized that memory configurations are desired that allow ECC to be included or left out without needing differing kinds of components, or adding expense if ECC is not required.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and structural, logical, and electrical changes may be made.

Figure 1:
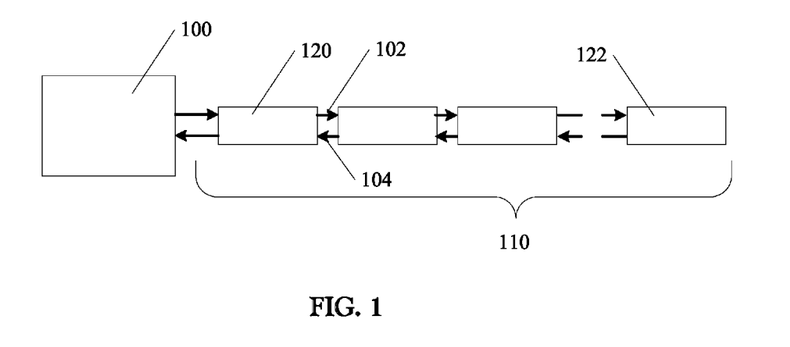
FIG. 1 shows a chained memory configuration according to an embodiment of the invention.

FIG. 1 shows a chained memory configuration, including a host processor or processors 100 coupled to a serially chained memory system 110. The memory system 110 includes a number of individual memory devices 120. In one embodiment, the memory devices 120 include solid state memory devices. Examples of solid state memory devices 120 include, but are not limited to dynamic random access memory (DRAM), static random access memory (SRAM), flash memory such as NOR or NAND, etc. In one embodiment, the solid state memory devices 120 include stacked chip memory devices, examples of which are described in more detail in FIGS. 5-7 below. FIG. 1 shows the number of chained memory devices 120 including a last memory device 120 in the chain. In one embodiment, the last device includes an error recovery device, such as error checking and correction (ECC) device 122.

In one example, error recovery data in the ECC device 122 is formed as the sum of the data written to the same address of all the other data units in the group. For example the address (100) in the ECC device 122 is written with A(100)+B(100)+C(100)... for as many memory devices (A, B, C, etc.) as there are in the chain. Thus ECC(n)=A(n)+B(n)+...+M(n) for any number of memory devices A through M and for each data address within the memory devices. A common example of summing to form error recovery data includes performing an exclusive or (XOR) operation on incoming data. Individual error recovery data from each memory device 120 can be combined to form error recovery data in the ECC device 122. In the event of a failure in any given memory device 120, data can be reconstructed using the error recovery data in the ECC device 122 at the end of the chain.

The memory devices 120 of the memory system 110 are shown serially coupled together in the chain. The serial connection includes a request path 102 (which can also be referred to as an outgoing path) from the host 100, and a response path 104 (which can also be called a return path). In one embodiment, memory requests are sent from the host 100 down the request path 102. In one example the memory request is in packet form, and may include both data, and address and control information to indicate a particular memory device 120 and a location within the particular memory device 120.

In one embodiment, a request travels down the request path 102 until it reaches the ECC device 122, then it returns on the response path 104. For example, a write request travels down the request path 102 including the data to be written, along with address information. As the data is written in the particular memory device 120, an ECC update operation is sent to the ECC device 122 and a completion signal is returned to the host on the response path 104. If a read operation is requested, the data is returned on the response path.

Although FIG. 1 shows four memory devices 120, embodiments of the invention are not so limited. Any number of chained memory devices 120 are possible. In one example, five memory devices 120 are used, including four memory devices for data, and one ECC device 122. In another example, nine memory devices 120 are used, including eight memory devices for data, and one ECC device 122.

Figure 2A:
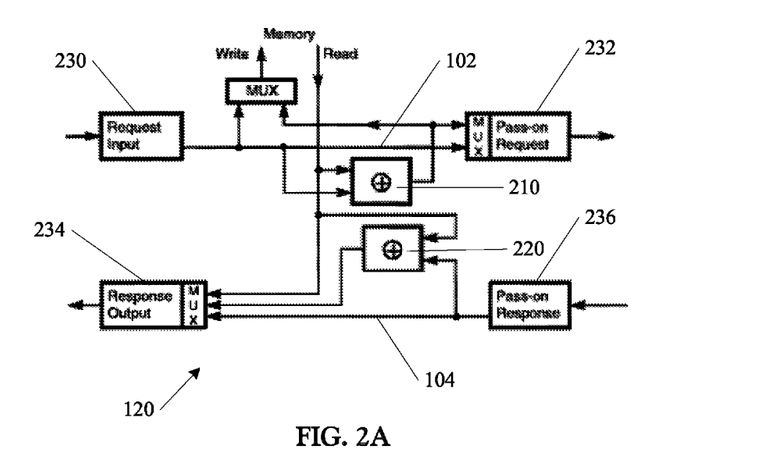
FIG. 2A shows a block diagram of a memory device according to an embodiment of the invention.

FIG. 2A shows a diagram of a portion of a single memory device 120 from FIG. 1. The request path 102 is shown along with the response path 104. The request and response paths 102, 104 allow serial communication through the memory device 120 while also allowing access to the device 120 itself, if a memory request is addressed to the particular device. The memory device 120 is shown with a memory request input 230 and a memory request output 232. When in a chained configuration as shown in FIG. 1, the memory request input 230 and memory request output 232 are located along the request path 102. The memory device 120 is also shown with a memory response input 234 and a memory response output 236. Similar to the above discussion, in a chained configuration as shown in FIG. 1, the memory response input 234 and memory response output 236 are located along the response path 104.

FIG. 2A also shows a first logic block 210 within the memory device 120, and coupled to the request path 102. In one embodiment, the first logic block 210 is configured to form error recovery data to update error recovery data that is stored in the ECC device 122.

In one example when new data is to be written to a given memory device 120 in the chain, corresponding error recovery data is updated. In one example, all memory devices 120 in the chain closer to the host controller than the addressed device merely pass the write request down the chain. Once the given memory device in the chain is reached, old data that is currently at the location to be written in the given memory device 120 is subtracted from the new data to be written at the location in the given memory device 120. The data to be written is then written into the location in the given memory device 120.

The difference is then passed down the remaining devices, if any, to the ECC device 122. In one example the ECC device then adds the difference that has been passed down, to the ECC data for the location to be written. In this way, the ECC data is updated to reflect the write operation. Because the error recovery data includes information from each memory device 120 in the chain, the data in any one failing memory device 120 can be reconstructed using the error recovery data.

FIG. 2A also shows a second logic block 220 within the memory device 120, and coupled to the response path 104. In one embodiment, when a recovery request is sent down the chain from the host 100, each second logic block 220 is configured to recover data from error recovery data in the ECC device 122 at the end of the chain. In one example each second logic block 220 is configured to XOR the error recovery data from the ECC device 122 as the error recovery data travels down the response path 104. When the response reaches the end of the chain proximate to the host 100, the XOR operations or other similar ECC operations in each second logic block 220 have provided the information necessary to reconstruct failed data in any given memory device 120. In one embodiment, the failed device that the data is to be recovered from is skipped as the error recovery data travels down the response path 104.

In one embodiment the memory device 120 includes local storage coupled to the first and/or second logic blocks 210, 220. Embodiments with local storage capacity allow error recovery data operations to take place independently within the memory device 120, without otherwise impacting other read or write operations or their timing. One configuration for local storage includes a register or similar memory capability within the first and/or second logic blocks 210, 220.

In one example, a specially configured ECC unit is installed in the chain of memory devices 120 as the ECC device 122. In another example, all memory devices 120 including the ECC device 122 have identical hardware, and the ECC device 122 is put into a mode that indicates that it is the ECC device 122. Embodiments using identical hardware for all memory devices 120 are more efficient for manufacturing purposes.

Figure 2B:
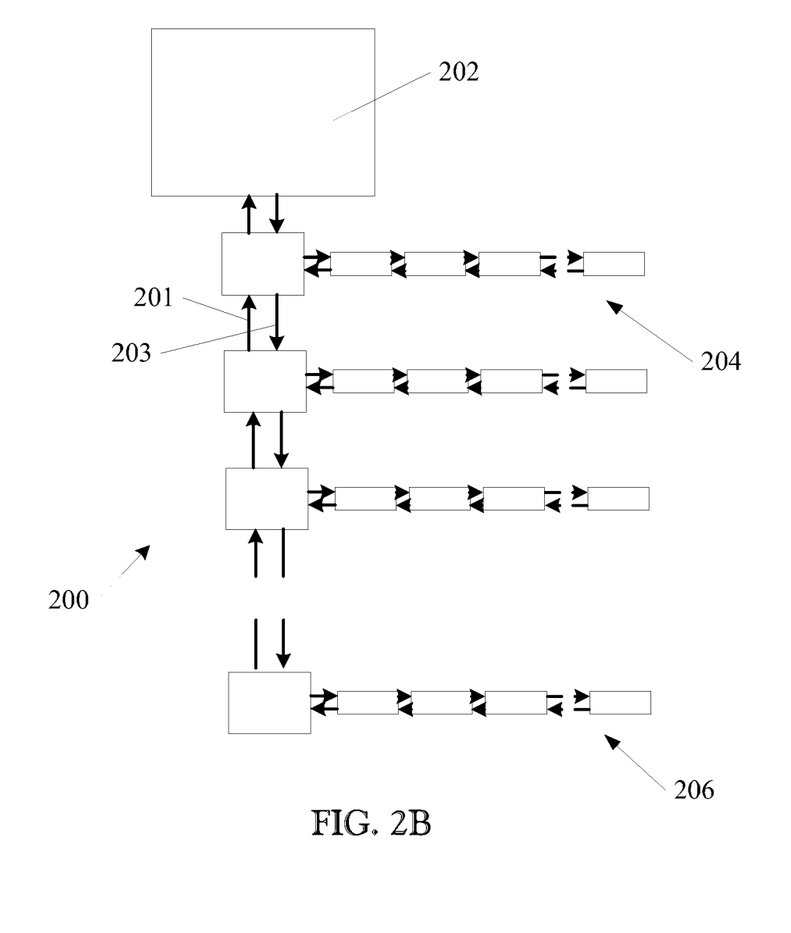
FIG. 2B shows a block diagram of another memory configuration according to an embodiment of the invention.

FIG. 2B shows a memory configuration 200 according to an embodiment of the invention. In FIG. 2B, a processor or processors 202 is coupled to a chain of sub-chains 204. In one example each sub-chain 204 is similar to the chain illustrated in FIG. 1. In one example, the memory configuration 200 includes an ECC sub-chain 206 located at the end of the chain of sub-chains 204. In one embodiment, serial connections are provided within the chain of sub-chains. FIG. 2B shows a request path 203 (which can also be referred to as an outgoing path), and a response path 201 (which can also be called a return path). In one embodiment, memory requests are sent from processor or processors 202 down the request path 203. In one example the memory request is in packet form, and may include both data, and address information to indicate a sub-chain, particular memory device within a sub-chain 204, and a location within the particular memory device.

The embodiment illustrated in FIG. 2B provides a hierarchy of error recovery ability. In one example, each level of the hierarchy is managed similar to the single level embodiment described in FIGS. 1 and 2A. Although a two level hierarchy is shown in FIG. 2B, other levels of hierarchy are also possible.

Figure 3:
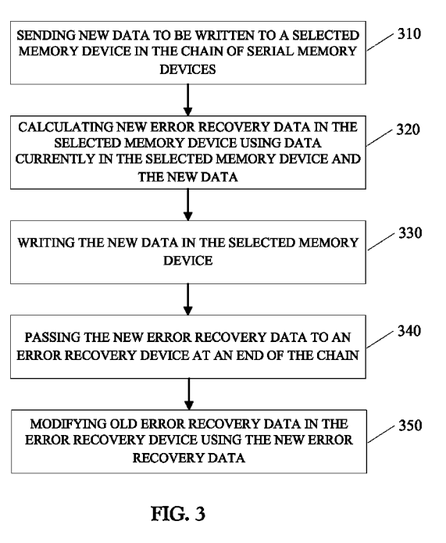
FIG. 3 shows features of a write operation according to an embodiment of the invention.

FIG. 3 shows a method of performing a write operation according to an embodiment of the invention. The example method shown if FIG. 3 can be performed using devices described above and illustrated in FIGS. 1 and 2A-2B. In operation 310, new data to be written is sent to a selected memory device in the chain of memory devices.

In operation 320, new error recovery data is calculated as the new data passes along the chain using data currently in the memory devices in the chain and the new data. In one example, old data is read at the selected device, and an ECC data update is calculated within the selected memory device by subtracting the old data from the new data. In one example, calculating new error recovery data includes an XOR operation. In one example, only the selected memory device in the chain performs the ECC data calculation, while other memory devices in the chain merely pass the request along the chain. One of ordinary skill in the art, having the benefit of the present disclosure will recognize that ECC operations other than XOR are also within the scope of the invention.

In operation 330, the new data is written in the selected memory device along the chain, and in operation 340, the new error recovery data is passed down the chain of memory devices to the ECC device at the end of the chain. In one embodiment, the new data is written at the same time that the new error recovery data is passed down the chain. Once the new error recovery data reaches the ECC device, in operation 350, the old error recovery data stored in the ECC device is modified by adding the new recovery data to the ECC data at the same address, generally the addition is a boolean XOR operation. Using the error recovery data and data from non-failing memory devices, data from any single failing memory device can be reconstructed.

Figure 4:
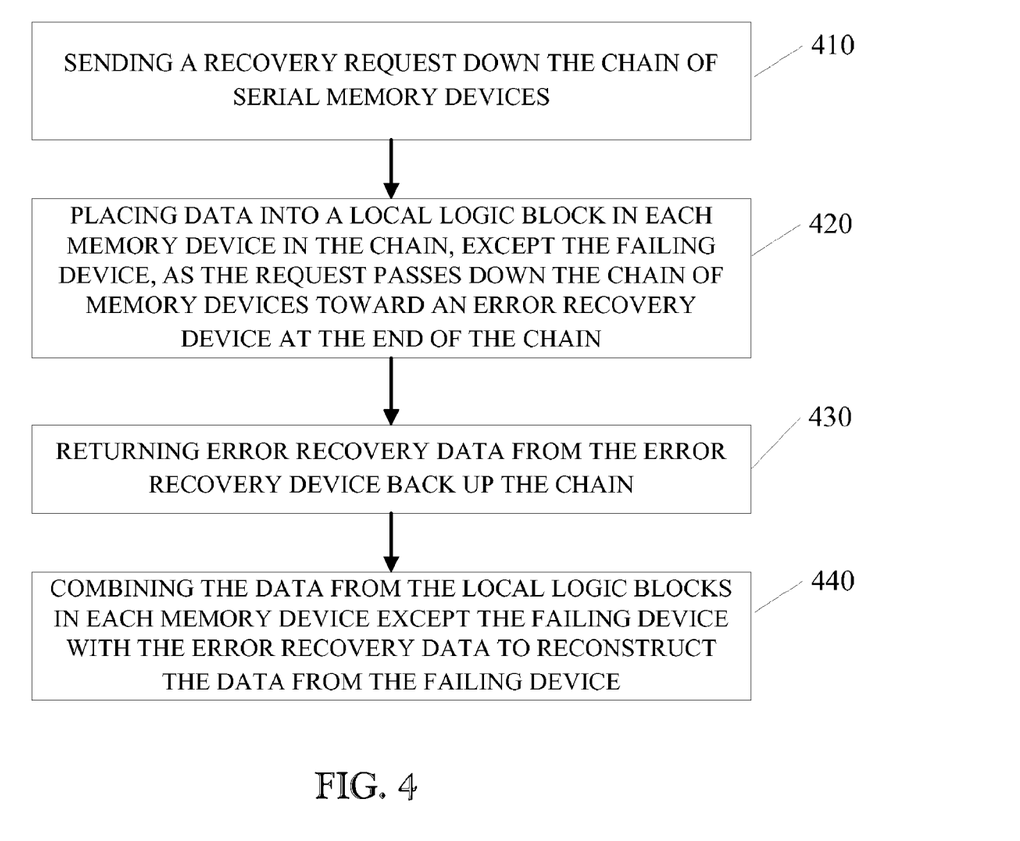
FIG. 4 shows features of a recovery operation according to an embodiment of the invention.

In one example, if a device determines it has an unrecoverable data error, that device responds to the host or chain controller which then starts a recovery sequence. FIG. 4 shows an example method of performing a data recovery operation according to an embodiment of the invention. In operation 410, a recovery request is sent down the chain of memory devices. The recovery request specifies a memory address and device in the chain. In operation 420 data is placed into a local logic block in each memory device in the chain, consisting of data at the specified address within each device except the failing device, as the request passes down the chain of memory devices toward an ECC device at the end of the chain. In one example, a second ECC block such as ECC block 220 is used, however the invention is not so limited. In one embodiment, all ECC operations are performed in a single logic block within each memory device.

In operation 430, after the recovery request reaches the ECC device at the end of the chain, the requested error recovery data is returned back up the chain. In operation 440 the data is combined from the local logic blocks as described in operation 420 in each memory device, except the failing device, with the error recovery data to reconstruct the data from the failing device. In one example, combining the data from the local logic blocks includes an XOR operation. After the individual XOR operations at each memory device, when the data finishes traveling back up the chain, the data from the failing memory device is recovered.

Using the methods and serially interconnected devices as described in examples above, the extra read and write operations that are burdensome in a parallel configuration happen automatically and without any effort or time taken by a memory controller at a host. Because extra operations in the described serial configurations take place further down the chain from a write operation, the extra operations are largely hidden from a performance standpoint. Further, using the serial methods and devices described in examples above, a memory controller does not have to generate multiple read requests in a recovery operation as is needed in a parallel configuration.

Figure 5:
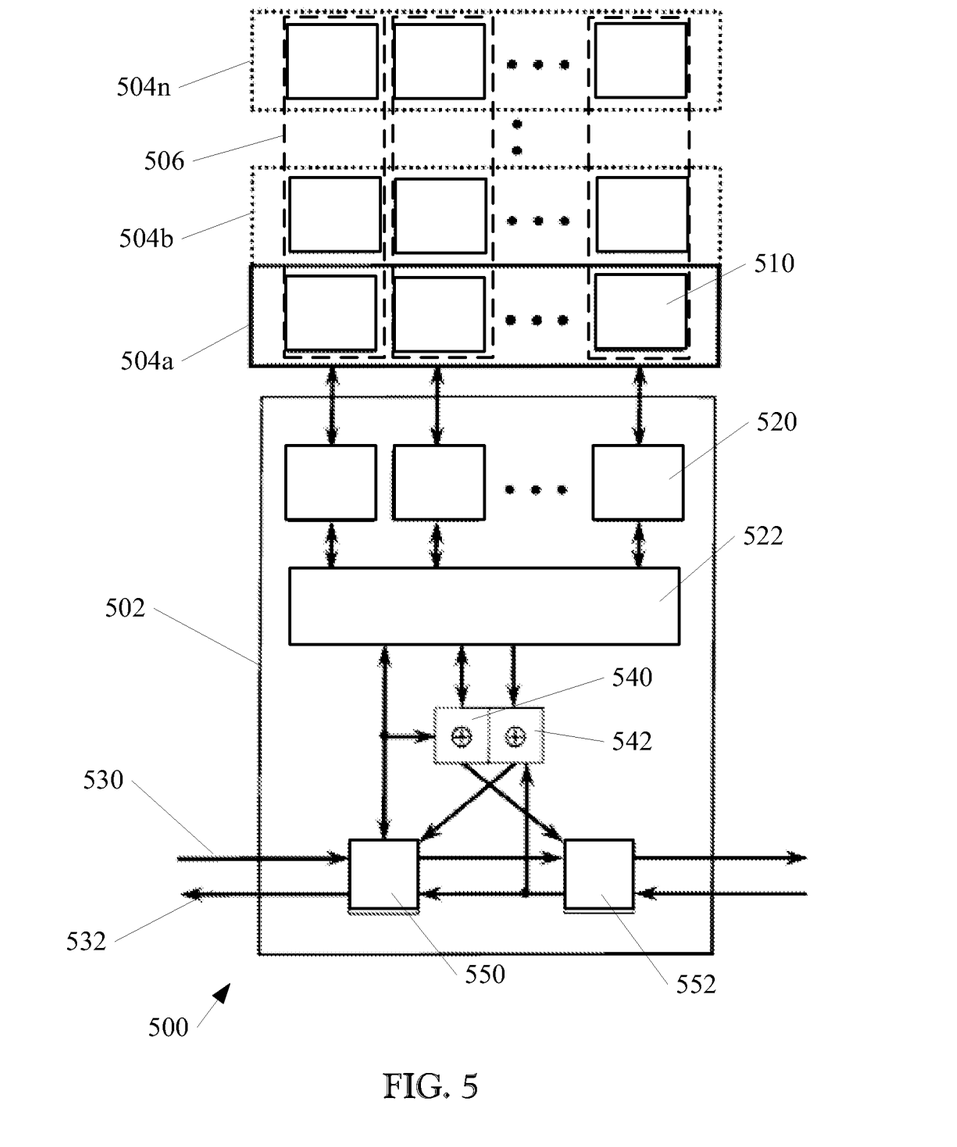
FIG. 5 shows a block diagram of a stacked die memory device according to an embodiment of the invention.

A number of types of memory devices are possible for use in methods and device configurations described above. Some examples include, but are not limited to, dynamic random access memory (DRAM), static random access memory (SRAM), flash memory such as NAND or NOR, etc. FIG. 5 shows a block diagram of a stacked chip memory device 500 that can be used in a chained memory system as described in embodiments above. Each individual memory device 500 operates to substantially concurrently transfer a plurality of outbound and/or inbound streams of commands, addresses, and/or data between a destination device (e.g., a host, such as one comprising one or more processors) and a set of stacked-array memory "vaults" 506. In one embodiment, a number of stacked chip memory devices 500 can be chained together as shown in the present disclosure.

FIG. 5 illustrates an example embodiment that includes a logic chip 502 as a base, with a number of stacked memory chips 504*a*-504*n* located on a side of the stacked memory chips 504*a*-504*n*. Each memory chip shown, such as memory chip 504*a* includes a plurality of memory banks 510. A number of banks 510 from stacked memory chips 504*a*-504*n* make up each vault 506. In the example shown, each vault 506 is controlled by its own vault controller 520. In the example shown, a crossbar switch 522 is included in the device 500 to route memory operations to and from various vaults 506.

FIG. 5 further illustrates a request path 530 and a response path 532 similar to the paths described in embodiments above. Individual stacked chip memory devices 500 include a source interface 550 and a pass on interface 552. Similar to embodiments described above, the stacked chip memory device 500 may include a first logic block 540 coupled to the request path 530, and a second logic block 542 coupled to the response path 532.

The illustrated stacked chip memory device embodiment aggregates control logic that is normally located on each individual memory array die. The memory vaults 506 shown in the illustrated example share common control logic. The memory vault architecture strategically partitions memory control logic to increase energy efficiency while providing a finer granularity of powered-on memory banks. Embodiments shown also enable a standardized host processor to memory system interface. The standardized interface may reduce re-design cycle times as memory technology evolves.

The apparatus and systems of various embodiments may be useful in applications other than a high-density, multi-link, high-throughput semiconductor memory subsystem. Thus, various embodiments of the invention are not to be so limited. The illustrations of the stacked chip memory device 500 are intended to provide a general understanding of the structure of various embodiments. They are not intended to serve as a complete description of all the elements and features of apparatus and systems that might make use of the structures described herein.

The novel apparatus and systems of various embodiments may comprise or be incorporated into electronic circuitry used in computers, communication and signal processing circuitry, single-processor or multi-processor modules, single or multiple embedded processors, multi-core processors, data switches, and other information handling systems.

Examples of such systems, include, but are not limited to supercomputers, televisions, cellular telephones, personal data assistants (PDAs), personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

While a number of embodiments of the invention are described, the above lists are not intended to be exhaustive. Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative and not restrictive. Combinations of the above embodiments, and other embodiments, will be apparent to those of skill in the art upon studying the above description.

What is claimed is:

1. A memory system, comprising:
    a plurality of memory devices in a serial chain, including:
        a number of memory devices; and
        an error recovery device, wherein the memory system is configured to store error recovery data in the error recovery device, wherein each of the number of memory devices includes logic to form the error recovery data.

2. The memory system of claim 1, wherein the error recovery device is one of the number of memory devices that includes a selectable mode to assign the memory device as an error recovery device.

3. The memory system of claim 2, wherein memory devices in the number of memory devices also include a selectable mode to assign the memory device as an error recovery device, wherein the selectable mode is not enabled in the number of memory devices.

4. The memory system of claim 1, wherein the plurality of memory devices include a plurality of solid state memory devices.

5. The memory system of claim 4, wherein the plurality of memory devices includes a plurality of DRAM memory devices.

6. The memory system of claim 1, wherein at least one memory device in the plurality of memory devices includes a stacked die memory device.

7. The memory device of claim 6, wherein the stacked die memory device is configured to include a number of memory vaults.

8. The memory system of claim 1, wherein at least one memory device in the plurality of memory devices includes a memory sub-chain.

9. The memory system of claim 1, wherein the error recovery device is last in the serial chain.

10. A memory device, comprising:
a stack of memory dies;
a logic die stacked with the stack of memory dies, wherein the logic die includes:
a request input path configured for serial communication through the memory device;
a response output path configured for serial communication through the memory device;
a first logic block coupled to the input path to form error recovery data;
a second logic block coupled to the output path to recover data using the error recovery data; and
a selectable mode to assign the memory device as an error recovery device.

11. The memory device of claim 10, wherein the stack of memory dies is configured to include a number of memory vaults.

12. The memory device of claim 11, wherein the logic die includes a number of memory controllers corresponding to the number of memory vaults.

13. The memory device of claim 10, wherein the first logic block is configured to form error recovery data by an XOR operation.

14. A solid state memory device, comprising:
a memory request input;
a memory request output configured to pass on memory requests to a downstream memory device; and
at least one logic block to form error recovery data, the solid state memory device having a selectable mode to assign the solid state memory device as an error recovery device.

15. The solid state memory device of claim 14, further including a second logic block for recovery of data.

16. The solid state memory device of claim 14, wherein the memory device is configured as a stacked die memory device.

17. The solid state memory device of claim 16, wherein the stacked die memory device includes a stack of memory dies and a logic die stacked with the stack of memory dies.

18. The solid state memory device of claim 17, wherein the stacked die memory device is configured to include a number of stacked flash memory dies.

19. The solid state memory device of claim 14, further including a response output path to return data to a host.

20. The solid state memory device of claim 19, further including a response input path to accept data from a downstream memory device and pass the data through the response output path to the host.

* * * * *